(12) United States Patent
Doughty et al.

(10) Patent No.: US 9,240,042 B2
(45) Date of Patent: Jan. 19, 2016

(54) WAFER SLIP DETECTION DURING CMP PROCESSING

(71) Applicant: GLOBALFOUNDRIES INC., Grand Cayman (KY)

(72) Inventors: John R. Doughty, Poughkeepsie, NY (US); Romany Ghali, Monroe, NY (US); Brian H. Stevens, Monticello, NY (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 79 days.

(21) Appl. No.: 14/061,849

(22) Filed: Oct. 24, 2013

(65) Prior Publication Data

US 2015/0117755 A1    Apr. 30, 2015

(51) Int. Cl.
*G06K 9/00* (2006.01)
*G06T 7/00* (2006.01)
*B24B 37/005* (2012.01)

(52) U.S. Cl.
CPC ............. *G06T 7/001* (2013.01); *B24B 37/0053* (2013.01); *G06T 2207/10016* (2013.01); *G06T 2207/30148* (2013.01)

(58) Field of Classification Search
CPC ..................... G06T 7/001; G06T 2207/10016; G06T 2207/30148; B24B 37/0053
USPC ........ 382/145, 149, 151; 451/5, 8, 36, 41, 59, 451/63, 285, 286, 287, 288, 290; 356/237.1, 237.5, 237.7, 394
See application file for complete search history.

(56) References Cited

U.S. PATENT DOCUMENTS

| | | | |
|---|---|---|---|
| 5,791,973 A * | 8/1998 | Nishio | 451/41 |
| 6,132,289 A | 10/2000 | Labunsky et al. | |
| 6,293,846 B1 * | 9/2001 | Oguri | 451/6 |
| 6,572,443 B1 | 6/2003 | Beckage et al. | |
| 6,634,924 B1 * | 10/2003 | Ono et al. | 451/5 |
| 6,796,879 B2 * | 9/2004 | Cheng et al. | 451/6 |
| 7,027,640 B2 * | 4/2006 | Park et al. | 382/152 |
| 7,052,364 B2 | 5/2006 | Zhang et al. | |
| 7,520,797 B2 | 4/2009 | Bottema et al. | |
| 2005/0130562 A1 * | 6/2005 | Nabeya et al. | 451/6 |
| 2009/0209175 A1 * | 8/2009 | Saito et al. | 451/6 |

* cited by examiner

*Primary Examiner* — Samir Ahmed
(74) *Attorney, Agent, or Firm* — Catherine Ivers; Hoffman Warnick LLC

(57) ABSTRACT

A wafer-slip detection apparatus used in association with a chemical mechanical polishing (CMP) apparatus may include an imaging device that generates images corresponding to at least an area of a rotation table of the CMP apparatus, and an image processing unit coupled to the imaging device for receiving and processing the generated images during a CMP process. The image processing unit includes a reference image that is compared with each of the generated images for detecting a wafer presence within the at least an area of the rotation table, whereby the detected wafer presence is indicative of a wafer-slip event.

13 Claims, 6 Drawing Sheets

WAFER SLIP DETECTION DURING CMP PROCESSING

BACKGROUND a. Field of the Invention

The present invention generally relates to chemical mechanical polishing (CMP) processes, and more particularly, to determining wafer-slip during such CMP processes.

b. Background of Invention

Chemical Mechanical Polishing/Planarization (CMP) may include a process of smoothing surfaces by utilizing a combination of chemical and mechanical forces. CMP may therefore serve as a hybrid between chemical etching and free abrasive polishing. However, it may, among other things, be imperative to retain semiconductor wafers undergoing CMP processes in place within CMP apparatuses. A failure to do so may, in some instances, cause such wafers to slip from their retaining means and ultimately break.

BRIEF SUMMARY

According to one exemplary embodiment, a wafer-slip detection apparatus used in association with a chemical mechanical polishing (CMP) apparatus may include an imaging device that generates images corresponding to at least an area of a rotation table of the CMP apparatus; and an image processing unit coupled to the imaging device for receiving and processing the generated images during a CMP process, such that the image processing unit including a reference image that is compared with each of the generated images for detecting a wafer presence within the at least an area of the rotation table. The detected wafer presence is indicative of a wafer-slip event.

According to another exemplary embodiment, a method of detecting wafer-slip in a chemical mechanical polishing (CMP) apparatus is provided. The method may include generating a reference image corresponding to at least an area of a rotation table of a CMP apparatus during a CMP process, whereby the reference image is generated during a non-wafer-slip event. Images corresponding to the at least an area of the rotation table are then generated during the CMP process, such that, during the CMP process, each of the generated images are compared with the generated reference image for determining an image characteristic difference. A wafer-slip event is then detected based on the determined image characteristic difference.

According to yet another exemplary embodiment, a computer program product for determining wafer-slip during a CMP process is provided, whereby the computer program product includes a computer readable storage medium readable by a processing circuit and storing instructions for execution by the processing circuit for performing a method. The method may accordingly include generating a reference image corresponding to at least an area of a rotation table of a CMP apparatus during a CMP process, whereby the reference image is generated during a non-wafer-slip event. Images corresponding to the at least an area of the rotation table are then generated during the CMP process, such that, during the CMP process, each of the generated images are compared with the generated reference image for determining an image characteristic difference. Once a wafer-slip event is detected based on the determined image characteristic difference, an interrupt control signal is generated when the wafer-slip event is determined, whereby the generated interrupt control signal is transmitted to the CMP apparatus for stopping the CMP process.

BRIEF DESCRIPTION OF THE SEVERAL VIEWS OF THE DRAWINGS

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1A:
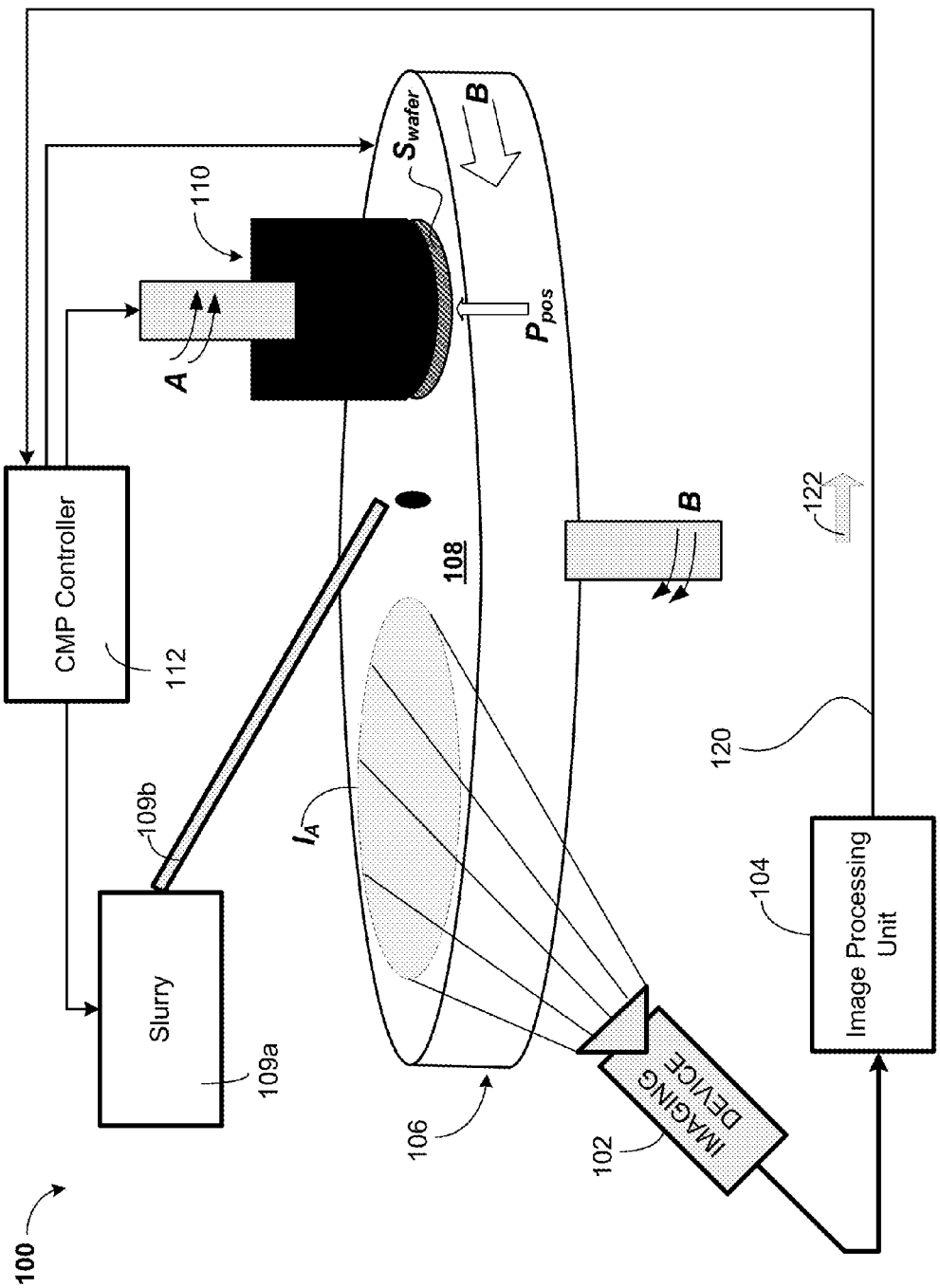
FIG. 1A is a system block diagram of a wafer-slip detection apparatus, according to one exemplary embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof, A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the area of CMP, for example, 300 mm semiconductor wafers may be processed on equipment (e.g., Model F-REX300) manufactured by EBARA CORPORATION for the purpose of, among other things, copper removal (i.e., planarization). In such processes a semiconductor wafer rotates on top of a rotary table (i.e., a pad) utilizing a retaining ring (i.e., a top ring). The top ring may include a pocket which retains the wafer in position on the pad using pressure and mechanical down force to maintain position while polishing.

When the semiconductor wafer slips out from the retaining ring, it may results in a broken wafer event. These broken wafer events consequently result in wafer damage and loss, a loss of tool utilization, a requisite need for changing parts in the tools, tool recovery or requalification activities, and/or delays associated with processing other semiconductor wafers. The following one or more exemplary embodiments thus describe an apparatus that detects an event corresponding to the semiconductor wafer slipping out of the retaining ring and, subsequently, shutting off the CMP process prior to the semiconductor wafer breaking within the CMP equipment chamber.

Referring to FIG. 1A, a system block diagram of a wafer-slip detection apparatus 100 according to one exemplary embodiment is depicted. The wafer-slip detection apparatus 100 may include an imaging device 102 (e.g., an infrared camera) and an image processing unit 104 that, among other things, processes the images that are received by the imaging device 102.

As depicted, a CMP apparatus may include a rotation table 106 having a polishing pad 108, a wafer carrier 110 that retains, for example, a semiconductor wafer $S_{wafer}$ for polishing, a slurry feeder unit 109a, 109b, and a CMP controller unit 112. In operation, the semiconductor wafer $S_{wafer}$ is retained by wafer carrier 110 via a retaining ring or top ring (not shown). The top ring may, as previously described, include a pocket (not shown) which retains the semiconductor wafer $S_{wafer}$ in position $P_{pos}$ on the pad 108 using pressure and mechanical down force in order to keep the semiconductor wafer $S_{wafer}$ in position $P_{pos}$ during the polishing process.

During the CMP process, the wafer carrier 110 may rotate in the direction of arrow A (e.g., anticlockwise), while the rotation table 106 rotates in the direction of arrow B (e.g., clockwise). The semiconductor wafer $S_{wafer}$ is polished based on the mechanical contact between the surface of the semiconductor wafer $S_{wafer}$ and the polishing pad 108. The CMP apparatus may optimize the polishing process using the CMP controller 112, which may, among other things, adjusts the slurry flow onto the polishing pad 108 by controlling the slurry feeder unit 110a, 110b, controls the rotation (i.e., r.p.m) of the a rotation table 106, and controls the rotation (i.e., r.p.m) of the wafer carrier 110.

As depicted, the imaging device 102 (e.g., an infrared camera) is configured to receive images of an area of the rotation table 106 such as imaging area $I_A$. During a non-wafer-slip event, the semiconductor wafer $S_{wafer}$ remains retained in position $P_{pos}$ during the polishing process by wafer carrier 110. During this non-wafer-slip event, the generated images from the imaging device 102 (e.g., an infrared camera) may include images of the polishing pad 108 of the rotation table 106 captured from the imaging area $I_A$. As illustrated, the imaging area includes an area of the rotation table 106 that is imaged as the rotation table 106 rotates. Therefore, during this non-wafer-slip event, the captured images are processed by the image processing unit 104 and may be determined to have substantially the same image characteristics (e.g., grayscale or RGB color pixel values).

Figure 1B:
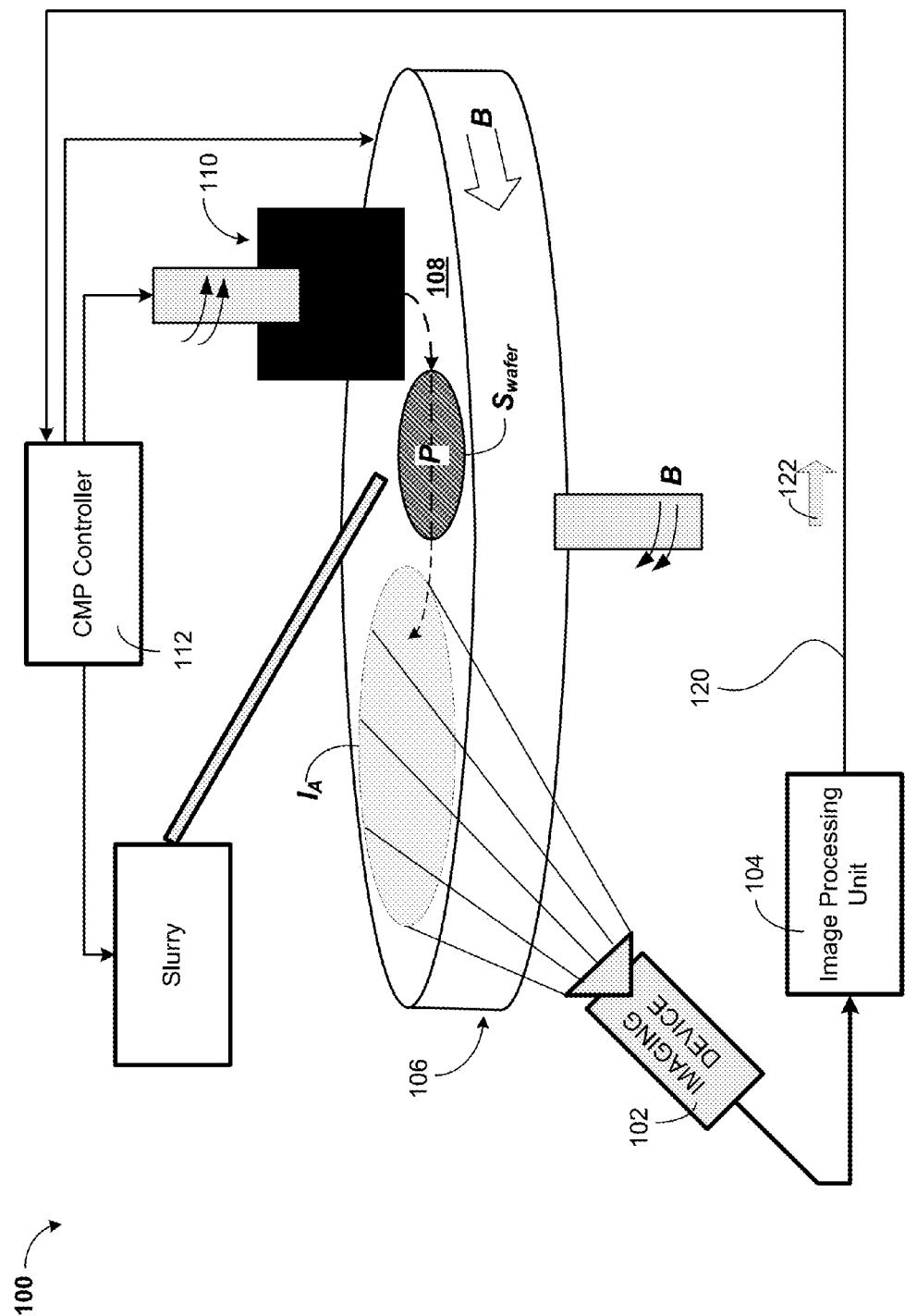
FIG. 1B depicts a wafer-slip occurrence within the system block diagram of FIG. 1A, according to one exemplary embodiment.

FIGS. 1B depicts a wafer-slip occurrence within the system block diagram of FIG. 1A, according to one exemplary embodiment. As shown, during a wafer-slip event, the semiconductor wafer $S_{wafer}$ may prematurely disengage from its retained position $P_{pos}$ (FIG. 1A) within the wafer carrier 110 during the polishing process. As the semiconductor wafer $S_{wafer}$ disengages, it may follow path P towards the imaging area $I_A$ as the rotation table 106 rotates in the direction of arrow B.

Figure 1C:
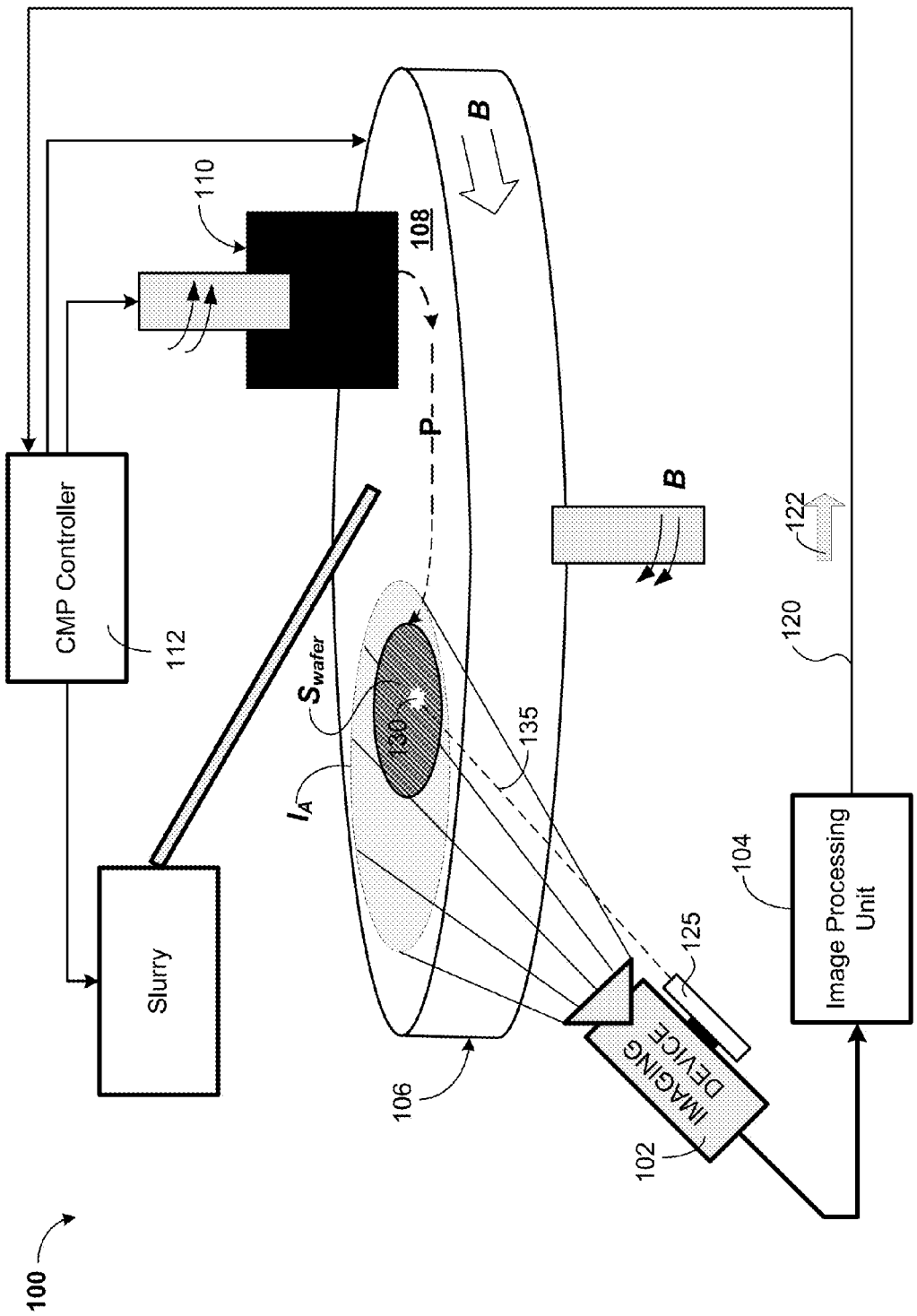
FIG. 1C depicts a wafer-slip detection scenario within the system block diagram of FIG. 1A, according to one exemplary embodiment.

Referring to FIG. 1C, the semiconductor wafer $S_{wafer}$ ultimately enters the imaging area $I_A$ following disengagement from the wafer carrier 110 and following path P towards the imaging area $I_A$. The image characteristics obtained from the imaging area $I_A$ by the imaging device 102 differ based on the existence or absence of the semiconductor wafer $S_{wafer}$ within the imaging area $I_A$. The detection of differences in the image characteristics is carried out by the image processing unit 104. Upon detection of such a difference, a detection signal (e.g., interrupt signal), as indicated at 120, may be generated by the image processing unit 104, which provides an indication of a wafer-slip event. The generated detection signal (e.g., interrupt signal) 122 is transmitted from the image processing unit 104 to, for example, the CMP controller 112. Upon receiving the detection signal (e.g., interrupt signal) 122 along communication link 120 by the CMP controller 112, a CMP process shut down may be immediately initiated. The CMP process shut down may include, for example, stopping the rotation of the rotation table 106 and the wafer carrier 110 by the CMP controller 112 in order to mitigate any breakage of the semiconductor wafer $S_{wafer}$ caused by the disengagement.

Figure 2:
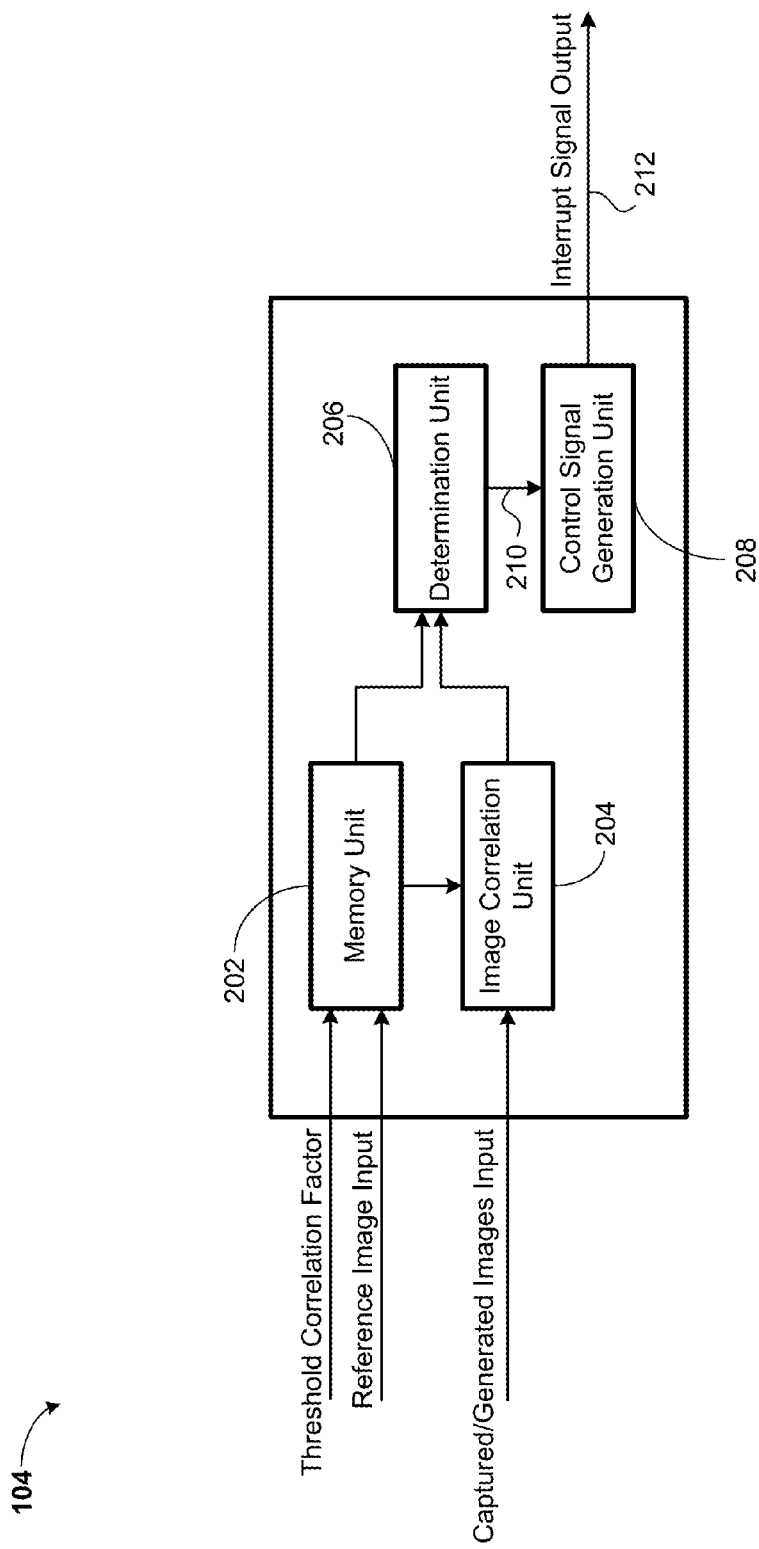
FIG. 2 is an exemplary block diagram of an image processing unit utilized within the system block diagram of FIGS. 1A-1C.

FIG. 2 is an exemplary block diagram of the image processing unit 104 utilized within the system block diagram 100 of FIGS. 1A-1C. As depicted, the image processing unit 104 may include a memory unit 202, an image preprocess/correlation unit 204, a determination unit 206, and a control signal generation unit 208.

The memory unit 202 may store a reference image that is captured from the imaging area $I_A$ during a non-wafer-slip event. In some implementations, the reference image may be captured during a direct observation, by a user, of the CMP apparatus operation in order to ensure the non-wafer-slip event. The memory unit 202 may also store a threshold correlation factor that determines a measure of the characteristic differences between the captured images by the imaging device 102 (FIGS. 1A-1C) and the reference image.

For example, the threshold correlation factor may be set to a high degree of correlation (e.g., 0.8-1.0) for determining when the captured images are substantially the same as, or similar to, the reference image. For example, when the measured correlation factors are above the threshold correlation factor, a non-wafer-slip event is ascertained, whereby the semiconductor wafer $S_{wafer}$ does not enter the imaging area $I_A$. Alternatively, the threshold correlation factor may be set to a low degree of correlation (e.g., 0-0.2) for determining when the captured images substantially differ from the reference image. For example, when the measured correlation factors are below the threshold correlation factor, a wafer-slip event is ascertained, whereby the semiconductor wafer $S_{wafer}$ has entered the imaging area $I_A$ after being disengaged from the wafer carrier 110 (FIGS. 1A-1C).

The image correlation unit 204 is coupled to both the memory unit 202 and the determination unit 206, and may be implemented as software, hardware, firmware, or any combination thereof. The image correlation unit 204 may generate a measure of correlation or a measured correlation factor by comparing the captured and generated images from the imaging device 102 (FIGS. 1A-1C) with the reference image stored in the memory unit 202.

For example, the image correlation unit 204 may provide a pixel-by-pixel comparison of the grayscale values between each captured image from the imaging device 102 (FIGS. 1A-1C) and the stored reference image. The closer the grayscale values between the pixels of each captured image from the imaging device 102 (FIGS. 1A-1C) and the stored reference image, the higher the correlation factor. Conversely, the higher the difference between the grayscale values between the pixels of each captured image from the imaging device 102 (FIGS. 1A-1C) and the stored reference image, the lower the correlation factor.

Alternatively, the image correlation unit 204 may calculate an average grayscale value for the entire pixels for each captured image and compare this grayscale average value with the average grayscale value of the stored reference image. Thus, the closer the calculated average values, the higher the correlation factor. Conversely, the more difference between these calculated average values, the lower the correlation factor.

The determination unit 206 may compare the measured correlation factor for each captured image from device 102 with the stored threshold correlation factor. For example, based on the threshold correlation factor being set to a high degree of correlation (e.g., 0.8-1.0), when the measured correlation factors are above the threshold correlation factor, a non-wafer-slip event is ascertained, which is indicative of the semiconductor wafer $S_{wafer}$ not entering the imaging area $I_A$. Alternatively, based on the threshold correlation factor being set to a low degree of correlation (e.g., 0-0.2), when the measured correlation factors fall below the threshold correlation factor, a wafer-slip event is ascertained, which is indicative of the semiconductor wafer $S_{wafer}$ entering the imaging area $I_A$ after disengaging from the wafer carrier 110 (FIGS. 1A-1C). In either case, if the threshold is exceeded, the determination unit 206 generates a wafer-slip indication signal, as indicated at 210.

The control signal generation unit 208, which is coupled to the determination unit 206, is configured to receive the wafer-slip indication signal 210 from the determination unit 206. Upon receiving the wafer-slip indication signal 210, the determination unit 206 may generate and transmit an interrupt signal, as indicated at 212. The control signal generation unit 208 may accordingly format and transmit the interrupt signal 212 using any desired medium (e.g., wireless or wired) or protocol to the CMP apparatus' CMP controller 112. The CMP controller 112 may then accordingly shut sown the CMP process upon receiving the interrupt signal 212.

Figure 3:
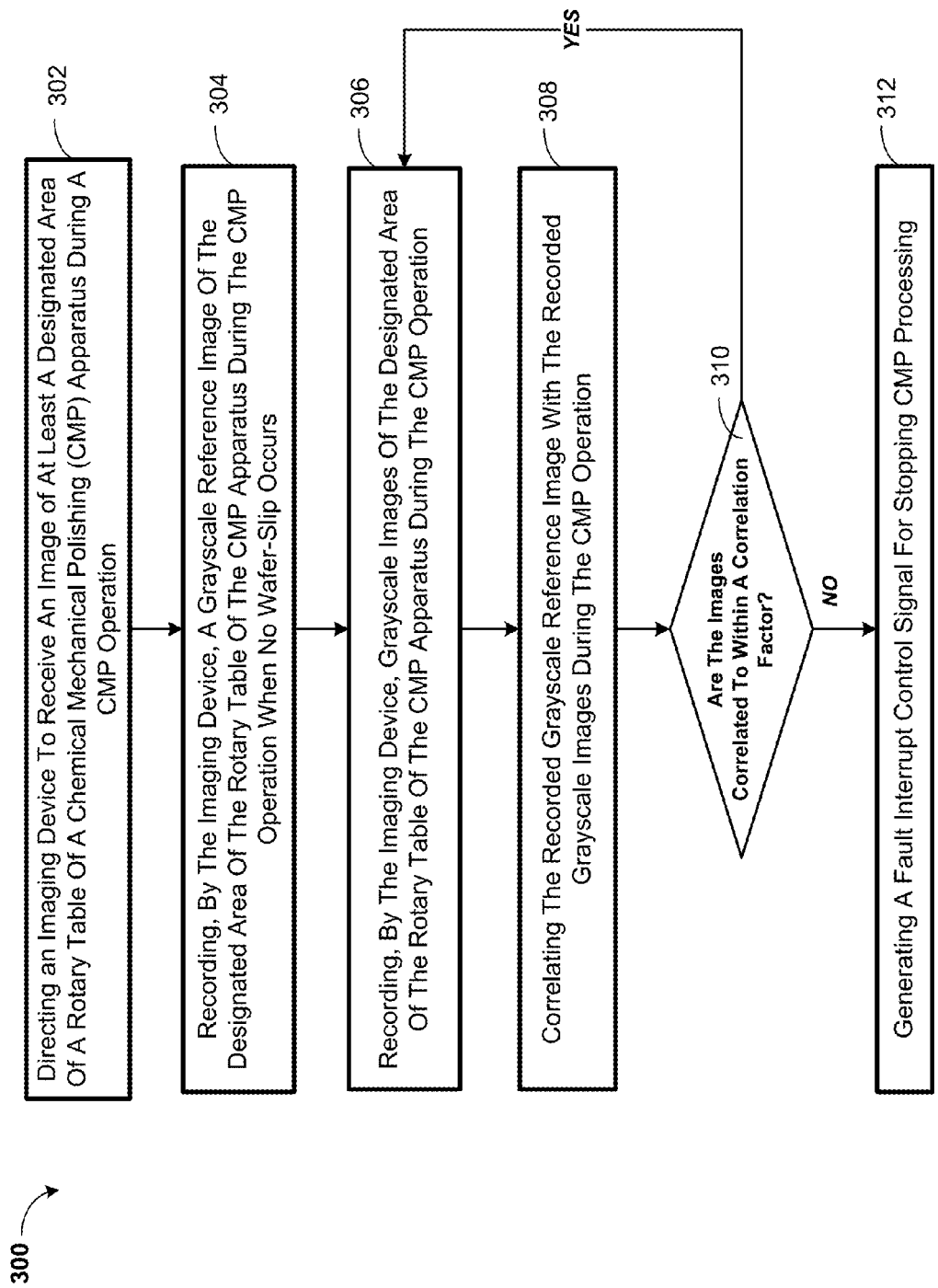
FIG. 3 is an operational flow chart corresponding to the operation of the exemplary embodiment of the wafer-slip detection apparatus depicted in FIGS. 1A-1C.

FIG. 3 is an operational flow chart corresponding to a wafer-slip detection (WSD) program 300 corresponding to the exemplary embodiment of the wafer-slip detection apparatus depicted in FIGS. 1A-1C. At 302, an imaging device 102 (FIGS. 1A-1C) such as an infrared camera may be directed at a designated area (e.g., area $I_A$) of the CMP apparatus rotation table 106 (FIGS. 1A-1C) during a CMP operation. The designated area (e.g., area $I_A$) may be selected such that the semiconductor wafer $S_{wafer}$ (FIGS. 1A-1C) ends up within the designated area (e.g., area $I_A$) of the rotation table 106 when the semiconductor wafer $S_{wafer}$ inadvertently slips from the wafer carrier 110 (FIGS. 1A-1C) during the CMP operation.

At 304, the imaging device 102 records a reference image such as, for example, a grayscale reference image of the designated area (e.g., area $I_A$) of the CMP apparatus rotation table 106 (FIGS. 1A-1C) during a CMP operation. The grayscale reference image of the designated area (e.g., area $I_A$) may be acquired during a non-wafer-slip event that may be corroborated by, for example, an observer (e.g., user/technician of the CMP apparatus).

At 306, once the grayscale reference image is recorded (304), the grayscale images of the designated area (e.g., area $I_A$) of the CMP apparatus rotation table 106 (FIGS. 1A-1C) are continuously captured and recorded during CMP operations.

At 308, each of the continuously captured and recorded grayscale images of the designated area (e.g., area $I_A$) of the CMP apparatus rotation table 106 (FIGS. 1A-1C) are correlated against the grayscale reference image. As previously described, a high correlation factor may be indicative of images that have pixel values that are substantially the same. For example, the grayscale reference image may correspond to a grayscale image of the CMP apparatus rotation table 106 (FIGS. 1A-1C) when no semiconductor wafer $S_{wafer}$ (FIGS. 1A-1C) is present within the designated area (e.g., area $I_A$). When the CMP processes is operating correctly, the continuously captured and recorded grayscale images of the designated area (e.g., area $I_A$) may be substantially identical to, or the same as, the grayscale reference image since, as with the grayscale reference image, no semiconductor wafer $S_{wafer}$ (FIGS. 1A-1C) is present within the designated area (e.g., area $I_A$) during the image capture. Thus, the pixel grayscale values of the grayscale reference image and the continuously captured and recorded grayscale images of the designated area (e.g., area $I_A$) are substantially the same.

However, a lower correlation factor may be indicative of images that have pixel values that are substantially different (i.e., a different image). For example, the grayscale reference image may correspond to a grayscale image of the CMP apparatus rotation table 106 (FIGS. 1A-1C) when no semiconductor wafer $S_{wafer}$ (FIGS. 1A-1C) is present within the designated area (e.g., area $I_A$). When the CMP process experiences a wafer-slip event, at least one of the continuously captured and recorded grayscale images of the designated area (e.g., area $I_A$) may be substantially different from the grayscale reference image. This is due to the one or more continuously captured and recorded grayscale images of area $I_A$ including an image of the semiconductor wafer $S_{wafer}$ (FIGS. 1A-1C) within the designated area (e.g., area $I_A$) during the image capture. In contrast, the grayscale reference image, however, does not include an image of the semiconductor wafer $S_{wafer}$ (FIGS. 1A-1C) during the image capture since the reference image corresponds to a non-wafer-slip event. Thus, the difference between the pixel grayscale values of the grayscale reference image and the continuously captured and recorded grayscale images of the designated area (e.g., area $I_A$) are consequently detected.

At 310, if the correlation factor between the grayscale reference image and the continuously captured and recorded grayscale images of the designated area (e.g., area $I_A$) is around or above a correlation range that is indicative of a high-degree of correlation (e.g., 0.8-1.0), it is indicative of the CMP process operating correctly based on no wafer-slip event occurring. Accordingly, the monitoring continues and the process returns to 306.

However, if at 310 the correlation factor between the grayscale reference image and the continuously captured and recorded grayscale images of the designated area (e.g., area $I_A$) is outside (e.g., below 0.8) the correlation range (e.g., 0.8-1.0) that corresponds to a high-degree of correlation (e.g., 0.8-1.0), it may be indicative of a CMP process failure based on the occurrence of a wafer-slip event. Accordingly, at 312 a fault interrupt control signal 122 (FIGS. 1A-1C) is generated at link 120 (FIG. 1A-1C) in order to deactivate or stop the CMP process. By deactivating or stopping the CMP process, for example, the rotational operation of rotation table 106 may be immediately stopped in order to avoid a breakage of the semiconductor wafer $S_{wafer}$ (FIGS. 1A-1C) that has become disengaged from the wafer carrier 110 (FIGS. 1A-1C).

The foregoing embodiment provides an example of utilizing imaging technology (e.g., one or more cameras) and image processing (e.g., grayscale analysis) to detect the occurrence of a wafer-slip event in a CMP apparatus. More specifically, the presence of a slipped wafer may be detected using the imaging technology and image processing. It may, however, be appreciated that other optical techniques may be utilized to detect a wafer-slip event.

For example, referring to FIG. 1C, an infrared laser 125 may be used in combination with the infrared camera to detect the presence of the semiconductor wafer $S_{wafer}$ after it has become disengaged from the wafer carrier 110. The infrared laser 125 may generate a brighter more intense spot 130 when the infrared signal 135 from the laser 125 strikes the semiconductor wafer $S_{wafer}$ within area $I_A$ relative to when the infrared signal 135 from the laser 125 strikes the surface of polishing pad 108 when no semiconductor wafer $S_{wafer}$ is present within area $I_A$. In both scenarios, the infrared camera 102 captures the image of the generated spot 130, while the image processing unit 104, among other things, ascertains the intensity or other optical characteristics (e.g., spot size, spot shape, etc) associated with the spot 130. In some implementations, the image processing unit 104 may limit its pixel processing to that of the generated spot 130 and, thus, reduce computational processing overhead. In other implementations, processing the intensity of the spot 130 may serve as an additional factor to that of the above-described grayscale correlation processing of the images. Thus, the reliability in detecting the wafer-slip-event may be substantially increased along with the computational processing overhead.

Figure 4:
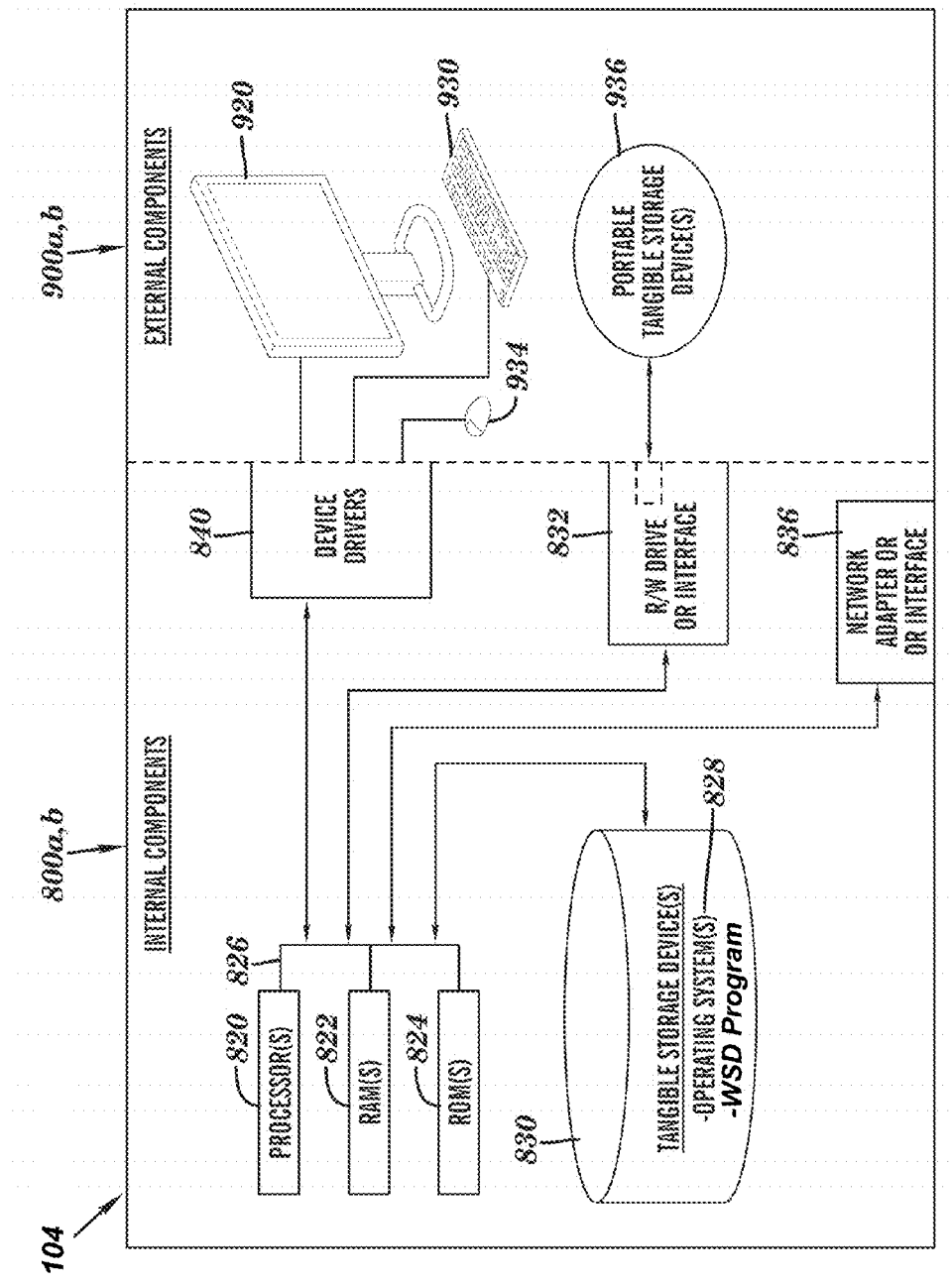
FIG. 4 is a block diagram of hardware and software within the measurement processing unit of FIGS. 1A-1C, according to one embodiment.

FIG. 4 shows a block diagram of the components of a data processing system 800, 900, such as image processing unit 104 (FIG. 1A-1C) in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Image processing unit 104 (FIGS. 1A-1C) may include respective sets of internal components 800a, b, c and external components 900a, b, c illustrated in FIG. 4. Each of the sets of internal components 800a, b, c includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs such as the wafer-slip detection (WSD) program 300 (FIG. 3) corresponding to image processing unit 104 (FIGS. 1A-1C) is stored on one or more computer-readable tangible storage devices 830 for execution by one or more processors 820 via one or more RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800*a*, *b*, *c* also includes a R/W drive or interface 832 to read from and write to one or more portable computer-readable tangible storage devices 936 such as a CD-ROM, DVD, memory stick, magnetic tape, magnetic disk, optical disk or semiconductor storage device. The WSD program 300 (FIG. 3) associated with image processing unit 104 (FIGS. 1A-1C) can be stored on one or more of the respective portable computer-readable tangible storage devices 936, read via the respective R/W drive or interface 832 and loaded into the respective hard drive 830.

Each set of internal components 800*a*, *b*, *c* may also include network adapters (or switch port cards) or interfaces 836 such as a TCP/IP adapter cards, wireless wi-fi interface cards, or 3G or 4G wireless interface cards or other wired or wireless communication links. WSD program 300 (FIG. 3), in image processing unit 104 (FIGS. 1A-1C), can be downloaded to image processing unit 104 (FIGS. 1A-1C) from an external computer (e.g., server) via a network (for example, the Internet, a local area network or other, wide area network) and respective network adapters or interfaces 836. From the network adapters (or switch port adaptors) or interfaces 836, the WSD program 300 (FIG. 3) associated with image processing unit 104 (FIGS. 1A-1C) is loaded into the respective hard drive 830. The network may comprise copper wires, optical fibers, wireless transmission, routers, firewalls, switches, gateway computers and/or edge servers.

Each of the sets of external components 900*a*, *b*, *c* can include a computer display monitor 920, a keyboard 930, and a computer mouse 934. External components 900*a*, *b*, *c* can also include touch screens, virtual keyboards, touch pads, pointing devices, and other human interface devices. Each of the sets of internal components 800*a*, *b*, *c* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A method of detecting wafer-slip in a chemical mechanical polishing (CMP) apparatus, the method comprising:
   generating a reference image corresponding to at least an area of a rotation table of a CMP apparatus during a CMP process, the reference image generated during a non-wafer-slip event;
   generating an infrared signal, via an infrared laser, of the at least an area of the rotation table during the CMP process;
   generating images including infrared signal images, via an imaging device, corresponding to the at least an area of the rotation table during the CMP process;
   comparing, during the CMP process, each of the generated images with the generated reference image for determining an image characteristic difference;
   determining a wafer-slip event based on the determined image characteristic difference; and
   shutting down the CMP process in response to the wafer-slip event being determined thereby preventing a broken wafer event.

2. The method of claim 1, further comprising:
   generating an interrupt control signal when the wafer-slip event is determined.

3. The method of claim 2, further comprising:
transmitting the generated interrupt control signal to the CMP apparatus for stopping the CMP process.

4. The method of claim 1, wherein the non-wafer-slip event comprises an event corresponding to the wafer remaining within a retaining means during the CMP process.

5. The method of claim 4, wherein the wafer-slip event comprises an event corresponding to the wafer being prematurely released from the retaining means during the CMP process.

6. The method of claim 1, wherein the wafer-slip event comprises the wafer being imaged within the at least an area of the rotation table during the CMP process, the wafer being imaged based on the wafer being projected onto the at least an area of the rotation table during the CMP process.

7. The method of claim 6, wherein the non-wafer-slip event comprises the wafer not being imaged within the at least an area of the rotation table during the CMP process.

8. The method of claim 1, wherein the generating of the reference image comprises generating a reference grayscale image.

9. The method of claim 8, wherein the generating the images comprises generating grayscale images.

10. The method of claim 9, wherein the comparing, during the CMP process, of each of the generated images with the generated reference image comprises correlating each of the grayscale images and the reference grayscale image for determining the image characteristic difference.

11. The method of claim 10, wherein the image characteristic difference comprises a correlation factor corresponding to the correlating.

12. The method of claim 11, further comprising:
comparing the correlation factor with a predetermined threshold correlation factor, wherein upon the predetermined threshold correlation factor exceeding the correlation factor, the wafer-slip event is determined.

13. A computer program product for determining wafer-slip during a CMP process, the computer program product comprising a non-transitory computer readable storage medium readable by a processing circuit and storing instructions for execution by the processing circuit for performing a method comprising:
generating a reference image corresponding to at least an area of a rotation table of a CMP apparatus during a CMP process, the reference image generated during a non-wafer-slip event;
generating an infrared signal, via an infrared laser, of the at least an area of the rotation table during the CMP process;
generating images including infrared signal images, via an imaging device, corresponding to the at least an area of the rotation table during the CMP process;
comparing, during the CMP process, each of the generated images with the generated reference image for determining an image characteristic difference;
determining a wafer-slip event based on the determined image characteristic difference;
generating an interrupt control signal when the wafer-slip event is determined;
transmitting the generated interrupt control signal to the CMP apparatus for stopping the CMP process; and
shutting down the CMP process in response to the wafer-slip event being determined thereby preventing a broken wafer event.

* * * * *